J. G. ROTE.
CHOCOLATE HEATING APPARATUS.
APPLICATION FILED AUG. 29, 1918.
1,304,101.
Patented May 20, 1919.
2 SHEETS—SHEET 1.
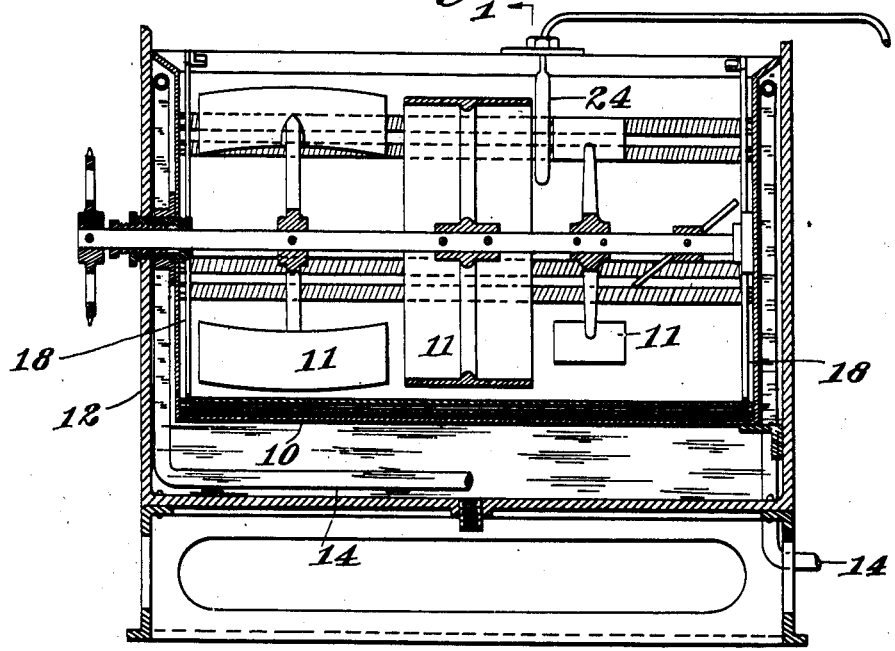
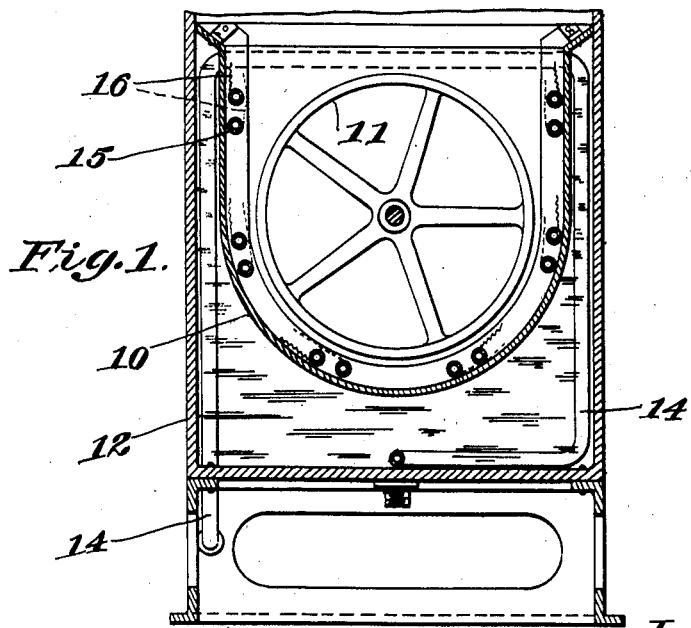
Inventor
John G. Rote
By Mitchell, Chadwick & Kent
Attorneys J. G. ROTE.
CHOCOLATE HEATING APPARATUS.
APPLICATION FILED AUG. 29, 1918.
1,304,101.
Patented May 20, 1919.
2 SHEETS—SHEET 2.
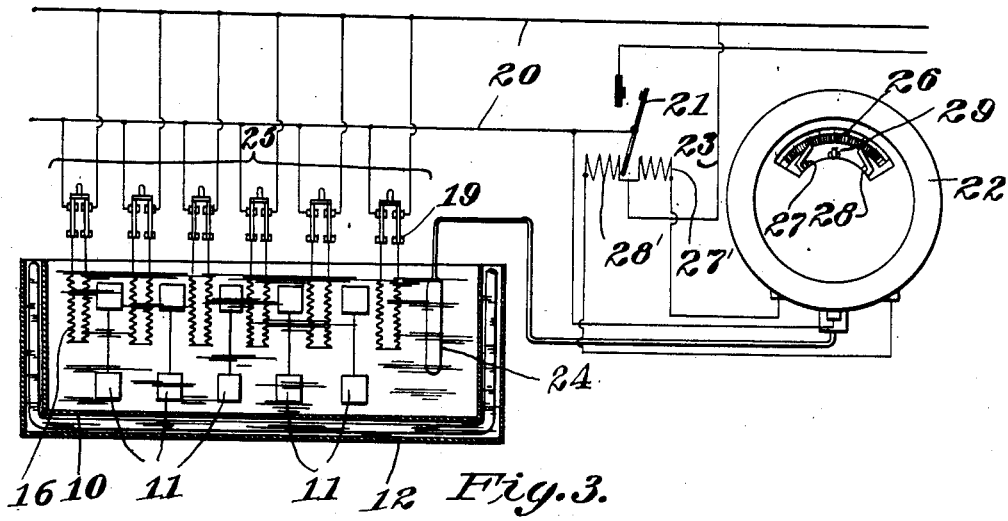
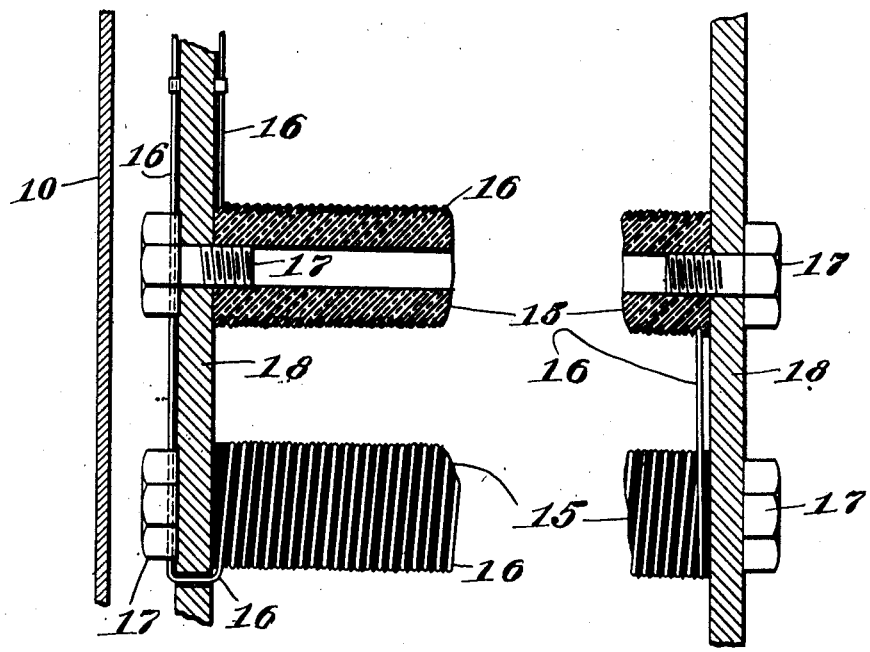
Inventor
John G. Rote
by Mitchell, Chadwick
& Kent
Attorneys

UNITED STATES PATENT OFFICE.

JOHN G. ROTE, OF BELMONT, MASSACHUSETTS.

CHOCOLATE-HEATING APPARATUS.

1,304,101.   Specification of Letters Patent.   Patented May 20, 1919.

Application filed August 29, 1918. Serial No. 251,922.

*To all whom it may concern:*

Be it known that I, JOHN G. ROTE, a citizen of the United States, residing at 88 Townsend road, Belmont, in the county of Middlesex and State of Massachusetts, have invented certain new and useful Improvements in Chocolate-Heating Apparatus, of which the following is a specification.

This invention relates to improvements in apparatus for handling chocolate. More particularly it relates to apparatus for the manufacture of candies known as "chocolates", in which a center of sugar, jelly, nut or other material, simple or composite, is by machinery coated with chocolate. The invention, which is illustrated as it may be applied to an enrobing machine, relates especially to the means for keeping the chocolate suitably fluid and within a predetermined narrow range of temperature.

In the practice of this art, the chocolate has to be raised to a certain temperature, to have proper fluidity, or else chocolate will flow around the center in too thick a layer, involving both too great weight for the piece, and too great cost for the aggregate weight. This temperature may, for example, be 89° F. Yet if the chocolate be raised more than 4° above this it will be too fluid, too much will run off from the centers, and also, if heated too much, the cocoa butter in it will become separated from the cocoa so that on cooling the product will have a gray aspect, unsuitable for first quality sales, with incidental loss. Another limitation results from the fact that at a temperature of 145° F. more or less, chocolate caramelizes; and so for good work it is necessary not to heat the walls of the container above the temperature of caramelization. No apparatus heretofore employed to maintain temperature within the permissible range has proven satisfactory, so far as I am aware, nor has there been any that is operable at all to attain the desired end successfully without a closeness of attention and a degree of skill which are not ordinarily available. For the above purposes the best modern practice hitherto has been to heat a broad area of tank wall by means of a water jacket maintained just under the caramelizing temperature of 145°. As this is well above the 93° at which the chocolate is too thin, and also is above the temperature at which the butter separates, constant care must be exercised to prevent the chocolate from getting too hot. To this end efforts are made to control the temperature of the jackets by heating pipes carrying steam, and by cooling pipes carrying cold water, either of which can be used at will. Yet the troubles continue. I have discovered that this is because of the heat capacity of the jacket. This continues to impart heat for a time, to chocolate whose temperature has already reached the permissible limit, before the corrective effect of a substitution of cold water flow for steam flow has reduced the jacket temperature enough to stop the rising chocolate temperature. By my present improvement, I reverse the direction of flow of heat. I use the water jacket as a medium into which heat flows in all directions from the chocolate. The jacket may be used initially to heat the chocolate, with the heat flowing from it to the chocolate as heretofore, but after the chocolate approaches its normal heat, the jacket ceases to perform this function; steam is shut off from it; and the jacket falls in temperature to below that of the chocolate and maintains whatever degree of temperature naturally occurs as it receives heat steadily from the chocolate and transfers it by conduction, radiation, or otherwise to the atmosphere. This flow of heat originates in an auxiliary heating arrangement immersed in the chocolate, capable of reaching only a limited non-caramelizing temperature, and having practically no capacity for storing heat. Under these circumstances, if a suitable heater be chosen, such as a wire heated by electricity, the flow of heat into the chocolate can be stopped at any instant. The temperature of the chocolate then immediately ceases to rise. It instantly, in fact, begins to fall, because of the continuing outflow of heat into the jacket. A thermostat having its controlling member immersed in the chocolate, or otherwise suitably placed, can be used to turn off the heat, thus; and to turn it on again as soon as the temperature of the chocolate has fallen a predetermined amount, which may be a degree or two. Thus the temperature of the whole of the chocolate can be kept easily and automatically within the narrow range of 4°. The particular heater preferred consists of a coil of wire heated by an electric current to the temperature of about 120°, the coil being of such electrical resistance, of such length, and having such a voltage applied to its terminals as will produce in it this temperature through an extensive region when it is immersed in chocolate. In designing apparatus, these features can all be easily predetermined. The relatively higher temperature of the wire becomes quickly dissipated in the surrounding mass of chocolate, and does no harm; and the heat should flow in at a sufficient rate to equal approximately the outflow to the jacket. This depends upon the temperature gradient between the chocolate and the jacket, and between the jacket and the atmosphere; and it may vary from time to time. Hence provision is made for a considerable number of units of immersed heaters, more or less of which may be used together, intermittently, if necessary, under the thermostatic control. The invention may be applied in various ways, and it is not to be understood as being limited to an enrobing machine, which is used for illustration. It is intended that the patent shall cover, by suitable expression in the appended claims, whatever features of patentable novelty exist in the invention disclosed.

In the accompanying drawings,

Figure 1 is an elevation of a part of the machine embodying the invention, in section across the axis of the mixing mechanism therein;

Fig. 2 is a medial elevation of the same in section along the axis of the mixing elements;

Fig. 3 is a fragmentary view of a detail, showing the electric heating elements on a larger scale; and Fig. 4 is a diagram of the machine and heat controlling features.

Referring to the drawings, 10 indicates a chocolate holding tank with bottom of semi-cylindrical shape, set in another tank 12 adapted to hold water which is or may be heated by a coil of steam pipe 14. In the operation of the machine, chocolate, being in suitably fluid state, is kept in a state of constant motion, mixture and distribution by mechanical elements 11, immersed in it, and is drawn up out of the tank 10 to the upper part of the machine, by means not shown, whence it flows down in a broad stream upon a wire screen conveyer carrying "centers" which are to be enrobed or coated. The excess which does not adhere to them drains off and passes back into the tank 10. As these elements of the enrober are not part of the invention, and as the invention may be used with different elements, they are not shown nor further described herein. The maintenance of the chocolate at a proper degree of fluidity, by maintaining it at a proper temperature in the tank 10 is the principal object of the present invention. For making any considerable rise in the temperature of the chocolate, the steam pipe 14 and the water jacket in tank 12 may be used; but when the chocolate has been raised to approximately the desired temperature, steam should be shut off; and thereafter the temperature of water in tank 12 may be neglected.

Within the tank 10, immersed in the chocolate, are a number of electric heaters, each comprising a bare wire 16 arranged in coils of a certain length, predetermined according to conditions, and operated by a predetermined voltage, so as to approximate a certain predetermined temperature when so immersed.

For example, it is computed that 150 ft. of "Advance" or "Nicrome" wire of 16 B. & S. gage, having 110 volts at its terminals and immersed in the chocolate will rise to a temperature approximating 120°. Such a wire may be wound on an insulating carrier, as for example, on a fiber tube in whose surface a screw thread has been cut, the wire being laid in the trough of the thread. There may be two of such tubes, arranged side by side at a suitable distance apart and connected in series in which case the terminals may be at the same end of the tank. Any variations needed, either to suit particular conditions, or to attain a desired result, may be determined by computation or by simple experimental variation. Such a wire carrier and its wire, or such a connected pair, constitute what is herein referred to as a single heating unit. The fiber carrier is marked 15, the resistance wire wound upon it 16, and metal yokes, one for holding the carrier ends at each end of the tank, are marked 18. These tubular carriers or holders are conveniently held by small bolts 17 which project through the straps 18 into the hollow centers of the fiber carriers at each end. By this arrangement, the heating units may be spaced as desired around the walls of the tank, one spacing being indicated in Fig. 1. In each case, the heater terminals may be brought up through the liquid to the top for connection to the electric circuits as indicated in the wiring diagram, Fig. 4. In the form illustrated, Fig. 3, the two ends of the heating unit, separated by maximum difference of potential, are relatively near together; and if it should be found in any case that the leakage of electricity is so great as to be undesirable, the wiring may be arranged so that the terminals are at opposite ends of the tank, with the entire length of the tank and resistance thereof between the maximum difference of potential. In that case, each carrier if made twice as large in diameter would hold in its own single length the full length of wire requisite.

The wiring and electric circuits may be variously arranged, but in general it is better to have a switch 19 which may be manually operated between each heating unit and the main wires 20 which supply current to them, so that at will any of the heating units may be disconnected.

The main wires 20 contain a switch 21 adapted to be operated automatically by a thermostat 22 either to make or to break the circuit through such heating units as are connected by switches 19.

The thermostat may be of any suitable style, and may be connected by any suitable arrangement of wiring and device for controlling the switch 21. Preferably the thermostat may be of a mercury actuated type having a bulb 24 on the end of a flexible tube, calibrated to be correct when the bulb and perhaps a portion of the tube are immersed in the chocolate, and being set in that portion thereof which is near the discharge, which in this case is by an elevating device, resembling a wheel (Figs. 1, 2). If preferred, however, it might be placed in a stream or body of the liquid which has already been discharged and is about to be used. An arrangement by which the thermostat may control the heating circuit is shown diagrammatically; and for the sake of simplicity is represented as in a shunt 23 across the main circuit. The thermostat indicated is of elemental type in which there is a scale 26 and a lower temperature limit post 27, an upper temperature limit post 28, and a pointer 29 whose position is moved by the changes of temperature, but which, when it makes contact with the lower limit post permits a current to flow through coil 27', thus attracting the armature of the switch 21, and closing that switch. The switch may be so arranged as to be held closed by gravity, a retaining spring, or by other well known means, until the temperature pointer 29 has swung along the scale and made contact with the upper limit post 28, when a current flows through the coil 28' and throws the switch 21 open. The heating units have the peculiarity that their temperature is really not higher than the very low temperature at which chocolate may caramelize. The wires carrying it are practically devoid of heat holding capacity.

Hence the inflow of heat to the chocolate ceases almost instantaneously with the stopping of the current by the thermostat. But as the chocolate continues to lose heat to the surrounding jacket, the temperature of the chocolate immediately begins to fall. When the circuit is re-made by the thermostat, it instantly begins to rise, assuming that enough heating units are connected to equal or exceed the rate of heat losses, because the heating wires are in the midst of the chocolate, and become instantly of higher temperature than the chocolate. It is, therefore, only necessary to set the thermostat with its limiting pointers at predetermined figures, within the permissible range of variation of temperature of the chocolate, (exaggerated in the drawing, for clearness) to produce a condition in which a temperature variation extending to the point indicated by either pointer, subjects the chocolate immediately to an effective corrective influence.

Whether the correction thus applied shall be adequate will depend of course upon the rate of flow of heat out from the chocolate into the jacket as compared with the rate of flow of heat into the chocolate from the immersed wires. As the temperature of both the jacket and the chocolate can be measured independently, and the difference known, it is possible to raise the temperature of the jacket by a small flow of steam, if needed, to make this temperature difference relatively small; and in that case but little inflow of electric current is needed to supply an amount equal to that which flows out, and so as to keep up the chocolate temperature to the desired point. While it is desirable that that inflow be gradual and constant, and to that end means is provided by the switch group 25 to reduce the rate at which inflow occurs when it occurs at all, the proper average of inflow will be maintained by the thermostat automatically. The use of the switch group 25 is, that if the operator observes that the temperature difference between the chocolate and the jacket is small, more of them may be opened, in which case the electric current will flow for a greater proportion of the whole time than if a greater number were closed. As a measure of absolute security, the steam may be turned off altogether when the jacket temperature has reached that of the atmosphere in the room. The jacket will then be subject to inflow of heat from the chocolate and to outflow into the atmosphere, and will come to rest at a point between; below the 90°, for example, of the chocolate, whose temperature it then cannot possibly ever raise.

While the invention is here illustrated as it may be applied with electricity as the medium for introducing the heat directly and safely to the chocolate, it will be apparent that some other form of direct heater with thermostatic control might be used. It is also manifest that although the invention has been particularly developed for application to chocolate, which is used here to illustrate it, it might be applied to other material without departing from the scope of the invention.

I claim as my invention:—

1. Apparatus for maintaining a regular temperature in liquid chocolate, comprising a tank for the chocolate; a jacket of water therefor, of a lower temperature than that of said chocolate; means independent of the jacket for introducing heat into the chocolate at a rate exceeding the rate of flow from it to the said jacket and its other heat losses; and a thermostatic device controlling the said inflow of heat.

2. Apparatus for maintaining a regular temperature in liquid chocolate, comprising a tank for the chocolate; a jacket of water therefor, of a lower temperature than that of said chocolate; means independent of the jacket for introducing heat into the chocolate at a rate exceeding the rate of flow from it to the said jacket and its other heat losses; a thermostatic device controlling the said inflow of heat; means whereby said rate of inflow may be adjusted to approximate and slightly to exceed, while not interrupted, said outflow and other losses.

3. Apparatus for maintaining a regular temperature in liquid chocolate, comprising a tank for the chocolate; a jacket of water therefor, of a lower temperature than that of said chocolate, arranged to withdraw heat therefrom continuously; means independent of the jacket for intermittently introducing heat into the chocolate; and a thermostatic device controlling the said inflow of heat.

4. Apparatus for maintaining a regular temperature in liquid chocolate, comprising a tank for the chocolate, having a regular place of discharge thereof; a jacket of water therefor, of a lower temperature than that of said chocolate, arranged to withdraw heat therefrom continuously; means independent of the jacket for intermittently introducing heat into the chocolate; and a thermostat having a test bulb arranged in the liquid at its point of outflow and adapted to control the said inflow of heat.

5. Apparatus for maintaining a regular temperature in liquid chocolate, comprising a tank for the chocolate; a jacket of water therefor, of a lower temperature than that of said chocolate; an electric heater immersed in the chocolate; and a thermostatic device controlling the flow of current to said heater.

6. Chocolate heating apparatus, comprising the combination of a tank for the chocolate; a jacket of water therefor; means to heat the water to a temperature higher than the chocolate and to cut off said heat, allowing it to fall to a temperature lower than that of the chocolate; means independent thereof for heating the chocolate; and a thermostatic device operated by the temperature of the liquid chocolate, and controlling said second heating means.

7. Apparatus for maintaining a regular temperature in liquid chocolate, comprising a tank for the chocolate; a jacket of water therefor, of a lower temperature than that of said chocolate; means independent thereof to introduce heat to a restricted locality of the chocolate; a mixing device adapted to keep the chocolate constantly in circulation; and a thermostatic device controlled by the temperature of the chocolate at a place remote both from the jacket and from said independent heating device, and controlling said independent inflow of heat.

8. Apparatus for maintaining a regular temperature in liquid chocolate, comprising a tank for the chocolate; means whereby heat continuously flows out from the tank; a source of heat within the tank having a temperature not exceeding the caramelization temperature of the chocolate; and a thermostatic device controlled by the temperature of the chocolate at a point removed from said heating means, and controlling the inflow of heat therethrough.

9. Chocolate heating apparatus, comprising a tank for the chocolate, arranged to lose heat continuously; an electric heater immersed in the liquid chocolate in the tank, and having a temperature above that of the mass of chocolate, and not higher than the caramelization temperature thereof.

10. Apparatus for heating chocolate, comprising a tank for the chocolate; means whereby it continuously loses heat; a multiplicity of electric heaters immersed therein, comprising long coils of resistance wire held at a low temperature, higher than that of the chocolate; means to disconnect individual coils at will; and a thermostatic controlling device for the connected coils, controlled by the temperature of the chocolate.

11. Heating apparatus for chocolate, comprising a tank for the chocolate; a water jacket therefor; heating means for the water jacket; a plurality of individual heaters for the chocolate independent of the jacket; and means to put some of them out of action at will; and means to cut off said heating means of the jacket.

12. Apparatus for maintaining a regular temperature in liquid chocolate, comprising a tank for the chocolate arranged to undergo loss of heat continuously; means for heating the chocolate within the tank having practically no heat capacity; and control means for the heat generating means whereby the introduction of heat to the chocolate ceases with the cutting off of said heat generation.

13. Apparatus for maintaining a regular temperature in liquid chocolate, comprising a tank for the chocolate; means providing continuous outflow of heat therefrom; means having practically no heat capacity for providing intermittent inflow of heat into the chocolate; and thermostatic means controlling the intermittent feature of said flow, and controlled by the temperature of said chocolate.

Signed at Cambridge, Massachusetts, this 24th day of August, 1918.

JOHN G. ROTE.